No. 633,408. Patented Sept. 19, 1899.
F. A. ABELEVEN.
INFLATING DEVICE FOR TIRES OF CYCLES OR OTHER VEHICLES.
(Application filed Jan. 7, 1899.)
(No Model.)
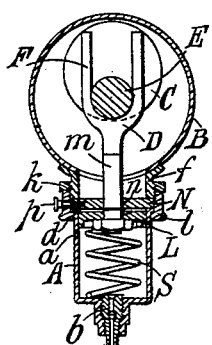
Fig.1.
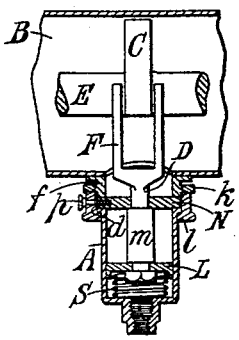
Fig.3.
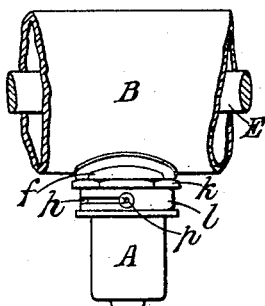
Fig.2.
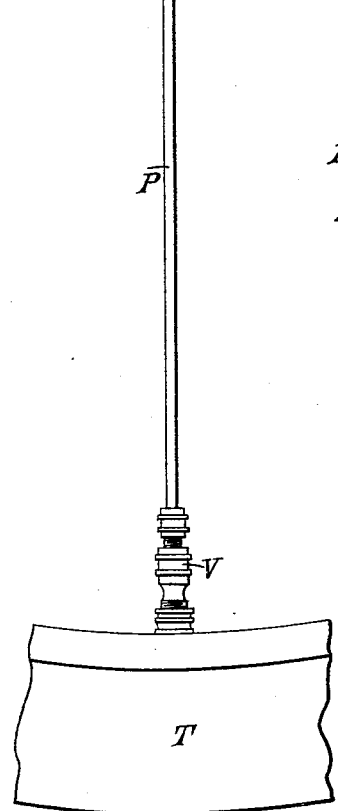
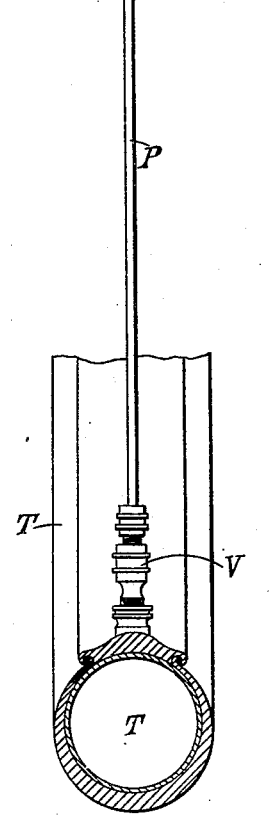
Witnesses
Inventor
Frederik A. Abeleven
By James L. Norris
Atty

UNITED STATES PATENT OFFICE.

FREDERIK ANTON ABELEVEN, OF SAMARANG, JAVA.

INFLATING DEVICE FOR TIRES OF CYCLES OR OTHER VEHICLES.

SPECIFICATION forming part of Letters Patent No. 633,408, dated September 19, 1899.

Application filed January 7, 1899. Serial No. 701,471. (No model.)

*To all whom it may concern:*

Be it known that I, FREDERIK ANTON ABELEVEN, railway-engineer, a subject of the Queen of the Netherlands, residing at Samarang, Java, have invented certain new and useful Improved Means for Automatically Inflating the Tires of Cycles, Motor-Cars, and the Like, of which the following is a specification, reference being had to the accompanying drawings, in which—

Figure 1 represents a transverse section, and Fig. 2 a side view, of the hub and part of the tire of a bicycle-wheel having my improved air-pump applied thereto. Figs. 3 and 4 represent other sections of the air-pump with the piston in a different position.

My invention relates to air-pumps for automatically inflating pneumatic tires on vehicle-wheels during the motion of the said wheels relatively to their axles. For this purpose my said invention consists partly in the combination, in an air-pump mounted on the hub of a vehicle-wheel having a pneumatic tire, of a piston-rod having a double-forked head the prongs of which engage both with the sides of a cam on an axle relatively to which the said hub moves and also with the sides of the said axle, while the end of the said piston-rod engages with the periphery of the said cam.

My said invention also partly consists in the combination, with a vehicle-wheel provided with a pneumatic tire and an axle extending through the hub and relatively to which the said hub moves, of a cam on said axle, a cylinder on said hub, a piston in said cylinder, the rod whereof bears against said cam, a spring in said cylinder pressing said piston toward said cam, a projection on the piston-rod, and a plate or washer having an oblong aperture therein and adapted to be brought into and out of engagement with said projection.

My said invention, moreover, comprises other improved combinations hereinafter set forth.

A small pump A is connected to the hub B of the wheel. The piston-rod D of the said pump extends within the hub, and its end is formed into a double fork F, the limbs of which surround the fixed axle E on both sides of an eccentric or cam C, firmly mounted on the axle exactly in alinement with the pump. The bottom of the fork F on the piston-rod bears on this eccentric or cam as it rotates with the hub and pump around the fixed axle, and by so doing the piston-rod is pushed inward and the air is forced into a pipe P, which connects the pump with the tire T of the wheel. This pipe is only a little thicker than a spoke of an ordinary bicycle-wheel. The said pipe may be soldered to the pump or connected to it by means of a screw-nut, and it is preferably screwed to an air-valve V of any suitable construction, so that by unscrewing the nut and bending the pipe sidewise a hand or foot pump may be connected to the valve in the event of the pump on the hub being out of order. Between the outlet of the pump and the pipe P a non-return valve *b* is provided, together with the usual air-hole *a* in the pump-body just beneath the highest position of the piston L. A spiral spring S is provided beneath the piston in order to keep the piston-rod always pressed against the eccentric or cam, and this cam, as well as the bottom of the fork on the piston-rod, may be hardened to diminish the wear of those parts. It will be seen that at each rotation of the wheel the piston is once forced inward and pushed outward again by the pressure of the spiral spring S, and so the tire is inflated either by turning the wheel by hand, if it is lifted from the ground, or by riding on the cycle.

I have, furthermore, provided means for disconnecting the fork F from the collar or cam C in order to put the pump-piston out of action as soon as the tire is sufficiently inflated. This arrangement consists in a flat washer N, loosely laid in a recess *d* in the bracket *f* on the hub to which the pump-body is screwed, and this washer is held in the recess by the pump itself. I provide the said washer in the center with an oblong aperture *n*, through which the piston-rod D can pass to and fro, and I make its smallest diameter of the same size as the round part of the piston-rod. The undermost portion *m* of that rod is also of an oblong shape of the same size as the said aperture in the washer and of the same length as the piston-stroke, so that in the lowermost position of the piston the sharp edges of the oblong part *m* of the piston lie exactly underneath the washer N. It will be seen that by turning the said washer N through an angle of ninety degrees the oblong portion $m$ of the piston-rod bears against the washer N and the piston-rod is held in its lowermost or outermost position, thus throwing the pump out of action.

Now I provide the circumference of the screw-nut $l$, which connects the pump to the bracket $f$ on the hub, (the exact position of the pump being secured by a second nut $k$,) with a quadrantal slot or aperture $h$ and screw a pin $p$ with a head into the washer through the slot $h$. In one position of the washer and the corresponding limiting position of the pin at one end of the slot $h$ the oblong aperture $n$ in the said washer registers with the oblong portion $m$ of the piston-rod, which can then pass freely through the washer, Fig. 1. By bringing the piston into its lowermost position, Fig. 3, and by turning the washer through an angle of ninety degress—viz., by bringing the pin $p$ into its other limiting position at the other end of the slot $h$—the sharp edge of the piston-rod is caused to bear against the washer and by so doing keeps the piston in the lowest position, so that the pump is put out of work and is not actuated by the collar or cam C while riding the bicycle. The washer may be secured in either of these positions by screwing the pin $p$ tightly into the washer, so that its head bears against the screw-nut $l$. Instead of making the whole of the undermost part $m$ of the piston-rod oblong I can also provide the piston-rod with two cams or projections arranged opposite each other, so that they have, together with the rod, the same oblong shape as the aperture $n$.

A small safety-valve may be connected to the air-valve V to avoid the occurrence of an excessive pressure in the tire, so that in pumping up the tires while riding the bicycle one need not be afraid of surpassing the highest allowable pressure for the tire and can throw the pump out of action at a stoppage.

The quantity of air pumped at each stroke—viz., at each revolution of the wheel in the tire—is very small; but as the wheel revolves approximately five hundred times while riding a kilometer a sufficient quantity of air can be forced into the tire in a short time.

What I claim is—

1. In an air-pump for use on a vehicle-wheel having a pneumatic tire, the combination, with the pump-cylinder and with a cam on the axle, of a piston-rod having a double-forked head the prongs of which engage both with the sides of said cam and also with the sides of said axle, and a spring in said cylinder whereby the end of said piston-rod is held in engagement with the periphery of said cam, substantially as and for the purposes hereinbefore described.

2. The combination, with a vehicle-wheel provided with a pneumatic tire and a fixed axle extending through the hub of said wheel, of a cam on said axle, a cylinder on said hub, a piston in said cylinder the rod whereof bears against said cam, a spring in said cylinder pressing said piston toward said cam, a projection on the piston-rod, and a washer having an oblong aperture therein and adapted to be brought into and out of engagement with said projection, substantially as, and for the purposes, hereinbefore described.

3. The combination, with a vehicle-wheel provided with a pneumatic tire and a fixed axle extending through the hub of said wheel, of a cam on said axle, a cylinder on said hub, a piston in said cylinder, the rod whereof bears against said cam, a spring in said cylinder pressing said piston toward said cam, a projection on the piston-rod, and a washer having an oblong aperture therein and adapted to be brought into and out of engagement with said projection, and a set-screw passing through a slot in the cylinder into said washer, substantially as, and for the purposes, hereinbefore described.

4. The combination, with a vehicle-wheel provided with a pneumatic tire and an axle extending through the hub of said wheel, of a cam on said axle, a cylinder on said hub, a piston in said cylinder the rod whereof has a double-forked end embracing said axle and cam, a spring in said cylinder pressing said piston toward said cam, a projection on the piston-rod, and a washer having an oblong aperture therein and adapted to be brought into and out of engagement with said projection, substantially as and for the purposes, hereinbefore described.

5. The combination with a vehicle-wheel provided with a pneumatic tire and an axle extending through the hub of said wheel, of a cam on said axle, a cylinder on said hub, a piston in said cylinder, the rod whereof has a double-forked end embracing said axle and cam, a spring in said cylinder pressing said piston toward said cam, a projection on the piston-rod, and a washer having an oblong aperture therein and adapted to be brought into and out of engagement with said projection, and a set-screw passing through a slot in the cylinder into said washer, substantially as and for the purposes hereinbefore described.

In testimony whereof I have hereunto set my hand in presence of two subscribing witnesses.

FREDERIK ANTON ABELEVEN.

Witnesses:
ED. SULLIVAN,
D. CLARENBACH.